United States Patent
Golden et al.

(10) Patent No.: US 8,940,263 B2
(45) Date of Patent: Jan. 27, 2015

(54) REMOVAL OF HYDROGEN AND CARBON MONOXIDE IMPURITIES FROM GAS STREAMS

(71) Applicant: Air Products and Chemicals, Inc., Allentown, PA (US)

(72) Inventors: Timothy Christopher Golden, Nantes (FR); Jeffrey Raymond Hufton, Folgelsville, PA (US); Mohammad Ali Kalbassi, Weybridge (GB); Garret C. Lau, Emmaus, PA (US); Christine Waweru, Manchester (GB); Christopher James Raiswell, Crewe (GB); Christopher Suggitt, Woking (GB); Daniel Patrick Zwilling, Drexel Hill, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 15 days.

(21) Appl. No.: 13/859,838

(22) Filed: Apr. 10, 2013

(65) Prior Publication Data
US 2014/0308176 A1  Oct. 16, 2014

(51) Int. Cl.
*B01D 53/02* (2006.01)
*B01D 53/22* (2006.01)
*B01D 53/56* (2006.01)
*B01D 53/94* (2006.01)
*B01J 8/00* (2006.01)
*B01J 23/32* (2006.01)
(Continued)

(52) U.S. Cl.
CPC ............................ *C01B 21/0416* (2013.01)

USPC ........... 423/247; 502/324; 502/345; 423/248; 423/418.2; 423/648.1; 423/658.3; 95/140

(58) Field of Classification Search
USPC ................ 423/247, 248, 418.2, 648.1, 658.3; 502/324, 345; 95/140
See application file for complete search history.

(56) References Cited

U.S. PATENT DOCUMENTS 1,418,246 A * 5/1922 Frazer et al. .................. 423/247
3,469,934 A   9/1969 Bocard et al.
(Continued)

FOREIGN PATENT DOCUMENTS

EP  0 454 531 B1  1/1998
EP  0916383 A1    5/1999
(Continued)

OTHER PUBLICATIONS

Kumar et al., "Trace carbon monoxide and hydrogen conversion prior to cryogenic distillation of air," Adsorption (2006) 12:361-373.
(Continued)

*Primary Examiner* — Patricia L Hailey
(74) *Attorney, Agent, or Firm* — Eric J. Schaal (57) ABSTRACT

Hydrogen and carbon monoxide impurities are removed from a dry gas comprising the impurities, wherein the dry gas is at least substantially free of carbon dioxide, by passing the dry gas with sufficient residence time, e.g. at least 1.5 s, through a layer of catalyst comprising a mixture of manganese oxide and copper oxide. The use of expensive noble metal catalysts to remove hydrogen may thereby be avoided. In addition, regeneration of the catalyst using oxygen-containing regeneration gas does not reduce the effectiveness of the catalyst.

20 Claims, 5 Drawing Sheets (51) Int. Cl.
  *B01J 23/70* (2006.01)
  *B01J 23/72* (2006.01)
  *C01B 3/00* (2006.01)
  *C01B 31/18* (2006.01)
  *C10K 1/00* (2006.01)
  *C01B 21/04* (2006.01)

(56) References Cited

U.S. PATENT DOCUMENTS

| | | |
|---|---|---|
| 3,672,824 A | 6/1972 | Tamura et al. |
| 3,758,666 A | 9/1973 | Frevel et al. |
| 4,019,879 A | 4/1977 | Rabo et al. |
| 4,019,880 A | 4/1977 | Rabo et al. |
| 4,541,851 A | 9/1985 | Bosquain et al. |
| 4,579,723 A | 4/1986 | Weltmer et al. |
| 4,713,224 A | 12/1987 | Tamhankar et al. |
| 4,944,273 A | 7/1990 | Baresel et al. |
| 5,110,569 A | 5/1992 | Jain |
| 5,137,548 A | 8/1992 | Grenier et al. |
| 5,202,096 A | 4/1993 | Jain |
| 5,232,474 A | 8/1993 | Jain |
| 5,238,670 A | 8/1993 | Louise et al. |
| 5,478,534 A | 12/1995 | Louise et al. |
| 5,656,557 A | 8/1997 | Hata et al. |
| 5,662,873 A | 9/1997 | Gary |
| 5,693,302 A | 12/1997 | Gary |
| 6,048,509 A | 4/2000 | Kawai et al. |
| 6,074,621 A | 6/2000 | Hsiung et al. |
| 6,093,379 A | 7/2000 | Golden et al. |
| 6,113,869 A | 9/2000 | Jain et al. |
| 6,511,640 B1 | 1/2003 | Kumar et al. |
| 7,306,658 B2 * | 12/2007 | White ............................ 96/132 |
| 7,524,358 B2 | 4/2009 | Saxena et al. |
| 8,012,446 B1 * | 9/2011 | Wright et al. .............. 423/437.1 |
| 2010/0273640 A1 * | 10/2010 | Schlitter et al. ................. 502/34 |
| 2012/0128563 A1 | 5/2012 | Cullen et al. |

FOREIGN PATENT DOCUMENTS

| | | |
|---|---|---|
| EP | 2184105 A1 | 5/2010 |
| FR | 2 739 304 A1 | 4/1997 |

OTHER PUBLICATIONS

Lamb and Vail, "The effect of water and of carbon dioxide on the catalytic oxidation of carbon monoxide and hydrogen by oxygen," J. Am. Chem. Soc., 1925, 47 (1), pp. 123-142.

Anderson, H.C. et al., "Removing Carbon Monoxide from Ammonia Synthesis Gas," Ind. Eng. Chem., 53, 1961, pp. 645-646.

Handbook of Preparative Inorganic Chemistry, 2nd Ed; Edited by G. Brauer, Academic Press, 1963, NY, pp. 1674-1676.

* cited by examiner

REMOVAL OF HYDROGEN AND CARBON MONOXIDE IMPURITIES FROM GAS STREAMS

BACKGROUND

The present invention relates generally to the removal of hydrogen ($H_2$) and carbon monoxide (CO) impurities from gas streams. In particular, the invention relates to the removal of these impurities from air. The invention has particular application in the production of high purity (HP) and ultra-high purity (UHP) nitrogen ($N_2$) gas.

In many chemical processes, carbon monoxide and hydrogen are undesired species in nitrogen because of their chemical reactivity. For example, the electronics industry requires UHP nitrogen (typically, CO and $H_2$ each less than 10 parts per billion by volume ("ppbv")) to provide an inert atmosphere for the production of semiconductor materials. Impurities present in the nitrogen during formation of the silicon wafers greatly increase chip failure rates.

When air is subjected to cryogenic separation to produce nitrogen, carbon monoxide present in the feed air will essentially end up in the product nitrogen since carbon monoxide and nitrogen have similar boiling points. Hydrogen enriches in the product nitrogen to approximately two times its concentration in the feed air. Therefore, the production of UHP nitrogen, i.e. nitrogen that is at least substantially free of carbon monoxide and hydrogen, for the electronics industry requires processes for removing hydrogen and/or carbon monoxide from the air or nitrogen stream.

In the conventional process for cryogenic separation of air to recover nitrogen and oxygen ($O_2$), feed air is compressed, cooled to low temperature, and then introduced to a cryogenic distillation unit (otherwise known as air separation unit or ASU), that usually involves one or two distillation columns. If not removed, water and carbon dioxide present in the feed air will freeze out and block heat exchangers employed for cooling the gas prior to distillation. The separation unit used to remove water and carbon dioxide is commonly referred to as the Front End Unit (FEU).

Before entering the FEU, atmospheric air is compressed to an elevated pressure from 50 to 150 psig (0.45 to 1.1 MPa), followed by water cooling and removal of condensed water. Throughout the document, pressures given in metric units are calculated on an absolute basis. The cooled air, which is then about 100° F. (38° C.), can be further cooled to 40° F. (4.5° C.) using combination of a water chiller tower and Direct Contact After Cooling (DCAC). The bulk of the water present in the air is removed by condensation and phase separation. The gas is then passed to a molecular sieve bed or mixed alumina/molecular sieve beds of the FEU where the remaining water and carbon dioxide are removed by adsorption. This separation takes advantage of the fact that both water and carbon dioxide are much more strongly attracted to the solid adsorbents than oxygen and nitrogen, so they are preferentially removed from the gas stream by the adsorbent. The air stream exiting the bed, which is at least substantially free of carbon dioxide and water, is then sent to the cryogenic distillation unit.

Eventually, the capacity of the adsorbent to adsorb water and carbon dioxide is exhausted and water and/or carbon dioxide will begin to "break through" the adsorbent bed and leave the FEU. The exhausted bed is taken "off-line", i.e. off feed gas, and regenerated to desorb some of the water and carbon dioxide, and restore the adsorption capacity of the adsorbent. To achieve constant feed and product gas flow rates, at least two adsorbent beds are used, one bed "on-line" operating under the adsorption step while the or each other bed is regenerated, their roles being periodically reversed in the operating cycle.

Bed regeneration is conducted by heating the bed to higher temperature (thermal swing adsorption, or TSA—see, for example, U.S. Pat. Nos. 4,541,851 and 5,137,548) or by decreasing the pressure of the gas in the bed with no heating (pressure swing adsorption, or PSA—see, for example, U.S. Pat. No. 5,232,474). The heating step of the TSA approach can be conducted at the original feed pressure, or more commonly, at a lower pressure of 2 to 15 psig (0.1 to 0.2 MPa). In any case, a flow of a gas that is at least substantially free of carbon dioxide and water is used to simultaneously purge the beds. The present invention involves a TSA regeneration step, so the case of PSA regeneration is not considered further.

During thermal regeneration, part of the purified air from the bed on feed, part of the UHP nitrogen product gas from the cryogenic distillation unit, or some of the waste stream from the cold box is heated to 200 to 250° C. The hot gas is passed through the adsorber bed being regenerated for a period of time equal to perhaps half of the total regeneration time. This step is then followed by flowing cool regeneration gas (e.g. at 5 to 30° C.) for the remainder of the regeneration time, thereby cooling the bed to that temperature. Regeneration is usually carried out in a countercurrent direction with respect to the adsorption step and is typically conducted at the lower pressure of 2 to 15 psig (0.1 to 0.2 MPa).

The conventional TSA FEU is quite capable of removing carbon dioxide and water from air. However, alumina or molecular sieve beds are not effective for the removal of carbon monoxide or hydrogen. Applications for UHP nitrogen in the electronics area often stipulate both hydrogen and carbon monoxide specifications. Thus, there is a need for processes for the combined removal of carbon monoxide and hydrogen from air.

Two approaches are typically considered to produce nitrogen that is at least substantially free of carbon monoxide and hydrogen. The first approach involves selective removal of carbon monoxide and hydrogen from the nitrogen product of the ASU (nitrogen post-treatment), and the second approach involves oxidation of carbon monoxide and hydrogen in the feed air followed by removal of carbon dioxide and water in the FEU (air pre-treatment).

In the area of nitrogen post-treatment, U.S. Pat. No. 4,713,224 teaches a one step process for purifying nitrogen containing trace quantities of carbon monoxide, carbon dioxide, oxygen, hydrogen and water in which the gas stream is passed over a material comprising elemental nickel and having a large surface area. Carbon monoxide, hydrogen, carbon dioxide and water are all chemisorbed or catalytically oxidized and subsequently removed. This approach is feasible only for nitrogen post-treatment, as the relatively high levels of oxygen in an air feed would oxidize the nickel and render it ineffective.

U.S. Pat. No. 4,579,723 discloses passing an inert gas stream containing trace levels of carbon monoxide, hydrogen, oxygen, and carbon dioxide through a catalyst bed containing a mixture of chromium and platinum on γ-alumina followed by a second bed composed of γ-alumina coated with a mixture of several metals. The first bed oxidizes carbon monoxide and hydrogen, and adsorbs water, while the second bed adsorbs carbon dioxide and oxygen, yielding a high purity product (less than 1 ppm impurities). These metallic catalysts are expected to be expensive.

Literature exists showing that carbon monoxide can be effectively adsorbed or chemisorbed on various adsorbents, and this suggests another approach for nitrogen post-treatment. U.S. Pat. No. 4,944,273 suggests that carbon monoxide can be selectively adsorbed by zeolites doped with metals such as calcium (Ca), cobalt (Co), nickel (Ni), iron (Fe), copper (Cu), silver (Ag), platinum (Pt), or ruthenium (Ru). U.S. Pat. No. 4,019,879 discloses the use of a zeolite containing copper (Cu+) ions for adsorbing carbon monoxide selectively. U.S. Pat. No. 4,019,880 describes the adsorption of carbon monoxide on zeolites containing silver cations. The carbon monoxide concentration can be reduced to levels as low as less than 10 ppm. U.S. Pat. No. 7,524,358 also describes use of silver-exchanged zeolites for carbon monoxide adsorption.

The more common approach for producing UHP nitrogen is air pre-treatment and involves oxidizing carbon monoxide and hydrogen in the feed gas and then removing carbon dioxide and water in the FEU. This approach is attractive because the oxidation reactions in the air stream are very favorable thermodynamically and equilibrium conversion is essentially complete. In addition, the by-products formed by the process are conveniently handled by the existing FEU.

The oxidation of carbon monoxide to carbon dioxide and of hydrogen to water in the presence of oxygen occurs readily in the absence of catalysts at high temperatures (e.g. above 500° C.). Oxidation at lower temperatures in moist air usually requires catalysts. Lamb and Vail (J. Am. Chem. Soc., 1925, 47 (1), 123-142) show that hopcalite catalyst can nearly completely oxidize carbon monoxide at 100° C., but the activity of the catalyst is diminished with increasing water content in the feed gas and the activity for hydrogen removal is essentially negligible at these same conditions. Hopcalite catalyst comprises a mixture of copper oxide and manganese oxide.

The carbon monoxide and hydrogen reactions can be carried out at modest temperature, e.g. at about 150° C., in the presence of precious metal catalysts based on palladium (Pd) or platinum (Pt) (Anderson, H. C. and Green, W. J., Ind. Eng. Chem., 53, 645, 1961). Thus, one approach for removing hydrogen and carbon monoxide from air is to pass compressed, heated air through a reactor vessel containing precious metal catalyst, then cool the effluent stream and reject water and carbon dioxide in the FEU (see, for example, U.S. Pat. No. 5,656,557). The main disadvantages of this removal technique include (i) the need to heat the air prior to introduction to the catalyst bed; (ii) the need for an extra heat exchanger and an extra booster heater that result in increased plot space; (iii) the need for more power to accommodate the additional system pressure drop and heat duty; and (iv) the relatively high capital cost associated with the reactor vessel, heaters, and expensive noble metal catalyst.

U.S. Pat. No. 6,074,621 mitigates some of these issues by utilizing the heat of compression of the feed air to provide warm air to a bed of noble metal catalyst for carbon monoxide oxidation, followed by cooling, water removal in the FEU, hydrogen removal by oxidation in a layer of noble metal catalyst in the FEU, followed by carbon dioxide and water removal in a layer of molecular sieve in the FEU. The temperature of the gas exiting the main air compressor is high enough to effectively oxidize carbon monoxide in the humid feed air, but not hydrogen. Hydrogen is much more difficult to oxidize than carbon monoxide and is oxidized in dry air, where the catalyst activity is typically acceptable even at ambient conditions.

Improved oxidation catalysts have also been described in the literature. For example, U.S. Pat. No. 5,693,302 describes use of a catalyst composed of gold or palladium on a titanium dioxide support for carbon monoxide and hydrogen oxidation. A combination of gold and/or silver with a platinum group metal on a support is proposed in U.S. Pat. No. 5,662,873. Although these catalysts may improve the kinetics of the oxidation reactions, they are inherently expensive.

The above examples conduct at least one oxidation reaction in a separate reactor (upstream of the FEU) operating at elevated temperature.

Earlier processes for the ambient temperature oxidation of carbon monoxide to carbon dioxide in air are given in U.S. Pat. Nos. 3,672,824 and 3,758,666.

U.S. Pat. No. 5,238,670 describes a process for removing carbon monoxide and/or hydrogen from air at a temperature of 0 to 50° C. by (i) removing water from air until it has a water content lower than 150 ppm; and (ii) removing carbon monoxide and hydrogen on a bed of particles containing at least one metallic element selected from copper (Cu), ruthenium (Ru), rhodium (Rh), palladium (Pd), osmium (Os), iridium (Ir) and platinum (Pt), deposited by ion-exchange or impregnation on zeolite, alumina or silica. EP0454531 extends this concept to first remove water and carbon dioxide, then react carbon monoxide and hydrogen at 0 to 50° C. over a zeolite-based catalyst with one metallic element selected from ruthenium (Ru), rhodium (Rh), osmium (Os), iridium (Ir) and platinum (Pt), then distil the purified air stream to produce UHP nitrogen. U.S. Pat. No. 5,478,534 describes use of the same catalyst layer with an upstream adsorbent layer to remove water, together with a downstream layer to remove carbon dioxide and water, before distillation.

U.S. Pat. No. 5,110,569 teaches a process for removing trace quantities of carbon monoxide and hydrogen from an air stream using a three layer adsorption bed having a first layer for adsorbing water (suitably alumina, silica gel, zeolite or combinations thereof), a second layer of catalyst for converting carbon monoxide to carbon dioxide (suitably nickel oxide or a mixture of manganese and copper oxides), and a third layer for adsorbing carbon dioxide and water (suitably zeolite, activated alumina or silica gel). The second layer may include a catalyst for converting hydrogen to water and this may be a supported palladium catalyst. The beds are regenerated by TSA or PSA methods.

In FR2739304, carbon monoxide is first oxidized to carbon dioxide which, together with carbon dioxide and water initially present in the feed air, is adsorbed using conventional adsorbents. Thereafter, hydrogen is adsorbed on a catalyst consisting of palladium (Pd) supported on alumina. The reference indicates that metals that can be used in place of palladium (Pd) are osmium (Os), iridium (Ir), rhodium (Rh), ruthenium (Ru), and platinum (Pt). The reference states that hydrogen is not oxidised under these conditions.

The TSA unit in U.S. Pat. No. 5,202,096 contains a layer of adsorbent(s) to remove water and carbon dioxide, a layer of catalysts to oxidize carbon monoxide and hydrogen, and a layer of adsorbent to adsorb water and carbon dioxide. The purified gas is further processed in a cryogenic process to separate oxygen/nitrogen and to generate a purge gas for the TSA unit. Hopcalite and nickel oxide (NiO) are specified for carbon monoxide oxidation and a precious metal catalyst for hydrogen oxidation. U.S. Pat. No. 6,113,869 applies a similar approach for purification of inert gas (Ar) rather than air where the carbon dioxide removal requirement is omitted.

U.S. Pat. No. 6,048,509 discloses a method and process utilizing a modified precious metal catalyst (platinum or palladium and at least one member selected from the group consisting of iron, cobalt, nickel, manganese, copper, chromium, tin, lead and cerium on alumina) for oxidation of carbon monoxide to carbon dioxide, followed by water removal in an adsorbent layer and carbon dioxide removal in a second adsorbent layer. An option for hydrogen removal is provided with a second catalyst layer (based on palladium/platinum) and adsorbents for water removal in subsequent layers.

U.S. Pat. No. 6,093,379 teaches a process for combined hydrogen and carbon monoxide removal consisting of a first layer to adsorb water and carbon dioxide on alumina or zeolite, and a second layer of a precious metal catalyst (palladium on alumina) to simultaneously oxidize carbon monoxide, adsorb the formed carbon dioxide and chemisorb hydrogen.

Kumar and Deng (2006) and U.S. Pat. No. 6,511,640 teach five layers in the TSA unit; a first layer to remove water, a second layer to oxidize carbon monoxide, a third layer to remove carbon dioxide, a fourth layer to oxidize hydrogen and a final adsorption layer to remove water and carbon dioxide. Hopcalite catalyst is specified for the carbon monoxide oxidation in the lower catalyst layer, and precious metal catalyst must be used to oxidise hydrogen to produce water in the upper catalyst layer. Hydrogen removal occurs by a chemisorption process rather than the typical reaction mechanism, as evidenced by breakthrough curves. Carbon dioxide interferes with the chemisorption and subsequent removal of hydrogen from the gas, so the precious metal catalyst is placed after both water removal (alumina layer) and carbon dioxide removal (13X). A final 13X layer is placed above the precious metal catalyst for capture of any water produced from the hydrogen oxidation.

Therefore, the current art for removing hydrogen, or carbon monoxide and hydrogen, with in-bed technology suffers from a few issues. First, the removal of hydrogen necessitates the use of expensive supported metal catalysts, typically a precious metal catalyst based on palladium, platinum, ruthenium, rhodium and the like, supported on alumina, zeolite, or silica. Precious metals are generally in high demand and subject to market forces, making them very expensive on a unit mass basis. For example, at the time of writing, the catalyst metal cost based on current palladium spot price ($610/oz) and 0.2 wt % palladium loading is around $45/kg catalyst. The metal content cost of a similar platinum catalyst is $115/kg catalyst ($1600/oz Pt spot price). The cost of the support, manufacture of the catalyst, shipping, etc. are additional charges on the final catalyst. In addition, catalysts employing precious metals are often loaded with the minimum amount of metal possible which makes them more susceptible to poisoning.

Secondly, the precious metal catalysts used in the in-bed technology are thermally regenerated in oxygen-containing streams, typically oxygen-enriched waste gas from the ASU. Noble metals are well known to resist oxidation, but over time they will slowly oxidize and lose catalytic activity under these conditions.

Thirdly, in-bed technologies designed to remove both carbon monoxide and hydrogen are often arranged with multiple catalyst layers, one for carbon monoxide oxidation and another for hydrogen oxidation. This arrangement is especially the case when there is reason to conduct the carbon monoxide oxidation and hydrogen oxidation at different locations within the TSA unit. For example, carbon monoxide oxidation is often conducted after water rejection (since water deactivates the catalyst) and before the carbon dioxide rejection (so carbon dioxide formed from the oxidation is removed as well). Hydrogen oxidation is often conducted after both water and carbon dioxide rejection. Precious metal-based catalyst can be specified for the two separate catalyst layers. It is widely known, however, that hopcalite is very effective for converting carbon monoxide to carbon dioxide. It is significantly cheaper than precious metal catalysts. This has led to the widespread specification of hopcalite for the carbon monoxide oxidation catalyst layer and noble metal-based catalyst for the hydrogen oxidation catalyst layer. Alternatively, it is known to use a silver-exchanged zeolite for carbon monoxide adsorption and removal, followed by a metal-based catalyst for hydrogen reaction. Increased layering in a packed bed leads to increased complexity for bed loading and replacement, and additional costs associated with screens for layer segregation. Some TSA vessel designs are not very amenable to multiple bed layers (e.g., radial flow designs), so an excessive number of layers can even make the approach infeasible.

Finally, most TSA designs incorporating oxidation catalyst utilize a final layer of adsorbent to capture any water or carbon dioxide formed from the oxidation of hydrogen and carbon monoxide in the catalyst layers. The adsorbent layer adds volume and therefore cost to the TSA vessel, as well as the cost for the adsorbent. It also adds void volume, which decreases the effective recovery of purified gas from the TSA. Removal of deactivated catalyst is made more difficult, as the adsorbent layer must first be removed. Finally, the catalyst is not as effectively regenerated as it would if it was at the product end of the bed. This is because hot purge gas is passed from the product end to the feed end of the bed, so the impact of heat loss (external losses to the environment and energy used for desorption) becomes more significant as the catalyst layer is placed further from the product end of the bed.

There is a need for new approaches for removing hydrogen, or hydrogen and carbon monoxide, as well as water and carbon dioxide from feed air to a cryogenic distillation process in the production of UHP nitrogen that overcomes at least one, preferably all, of these disadvantages with conventional techniques.

BRIEF SUMMARY

According to a first aspect of the present invention, there is provided a process for removing hydrogen and carbon monoxide impurities from a dry gas (preferably air) comprising said impurities, wherein said dry gas is at least substantially free of carbon dioxide, said process comprising passing said dry gas through a layer of catalyst (preferably at an elevated pressure) comprising a mixture of manganese oxide and copper oxide, with sufficient residence time to produce product gas that is at least substantially free of hydrogen and carbon monoxide.

An example of a catalyst comprising a mixture of manganese oxide and copper oxide is hopcalite. The Inventors have observed that hopcalite is able to simultaneously (i) oxidize carbon monoxide to carbon dioxide; (ii) chemisorb hydrogen; and (iii) oxidise hydrogen to form water, in addition to adsorbing the resultant carbon dioxide and water so produced. The mechanisms involved for carbon monoxide are as follows:

$$CO\text{ (gas)} \leftrightarrow CO\text{ (adsorbed)}$$

i.e. CO from gas adsorbed on the catalyst surface $$CO\text{ (adsorbed)} + O\text{ (surface)} \leftrightarrow CO_2\text{ (adsorbed)}$$

i.e. adsorbed CO reacts with oxygen on the catalyst surface to form $CO_2$ $$CO_2\text{ (adsorbed)} \leftrightarrow CO_2\text{ (gas)}$$

i.e. $CO_2$ is desorbed into the gas phase

Similar mechanisms are involved for hydrogen removal (substituting "$H_2$" for "CO" and "$H_2O$" for "$CO_2$" in these reaction mechanisms).

The state of the art recognises that hopcalite may be used for carbon monoxide oxidation, but not that hydrogen may also be removed simultaneously using this catalyst.

Based on the state of the art, it was entirely unexpected that hydrogen would be removed by an adsorption mechanism on hopcalite. As indicated above, hopcalite is a well-known catalyst. In the catalytic removal of hydrogen, the feed stream hydrogen is converted to water. Therefore, in a purely catalytic process, the feed impurity is converted to another species which may then exit the reactor bed. However, the results of the experiments reported herein (see FIGS. 3 to 6) clearly indicate that hydrogen is removed by adsorption. In this regard, hydrogen breaks through the bed and continues to increase in concentration until the bed is saturated. Additional water was not observed in the effluent stream, although the Inventors acknowledge that water may also be formed from some of the hydrogen in the dry gas, but any product water must then be adsorbed by the catalyst. However, the Inventors note that the limiting hydrogen removal mechanism is adsorption which in turn determines the size of the adsorption bed.

The hopcalite is acting both as a catalyst and an adsorbent. The observation that hydrogen may be removed by adsorption has not been made previously because the hopcalite layer must satisfy certain criteria for hydrogen removal to be enabled.

First, at least substantially all of the water and carbon dioxide must be removed from the gas feed before it reaches the hopcalite, as they both compete with hydrogen for chemisorption sites in the catalyst. In this connection, it is preferable that the levels of water and carbon dioxide be each reduced to no more than 10 ppm, preferably no more than 1 ppm. This means that the hopcalite layer must be placed downstream of water and carbon dioxide removal layer(s) in an adsorption unit such as a TSA unit. As explained above, this is not the case in the relevant in-bed TSA prior art utilizing hopcalite for carbon monoxide oxidation.

Secondly, it has been found from laboratory testing that a minimum residence time in the catalyst layer is necessary in order to effectively remove hydrogen by chemisorption. Where hopcalite is used in the art for carbon monoxide oxidation after water and carbon dioxide removal, the gas residence time in the catalyst bed is less than 1.2 s. The Inventors have found that significant hydrogen chemisorption on hopcalite requires a greater gas residence time in the catalyst layer, typically at least 1.5 s, and more preferably more than 2 s.

It is now possible to use a single layer of relatively inexpensive catalyst to remove trace levels of carbon monoxide, hydrogen, carbon dioxide, and water from a gas stream, in particular air. This approach may be used to yield a simpler and lower cost layered TSA bed for such application.

As an added benefit of this approach, as it is a mixture of metal oxides, hopcalite cannot suffer from over-oxidation during thermal regeneration with oxygen-enriched purge gas.

According to a second aspect of the present invention, there is provided an adsorption unit (preferably a TSA unit) for purifying an oxygen-containing gas (preferably air), said unit comprising an adsorbent bed, said adsorbent bed consisting of:
  at least one adsorbent layer for removing water and carbon dioxide from said gas to produce dry gas that is substantially free of carbon dioxide;
  a layer of catalyst for removing hydrogen and carbon monoxide impurities from said dry gas to produce product gas that is substantially free of hydrogen and carbon monoxide; and
  optionally, a further adsorbent layer for removing carbon dioxide from the product gas,
wherein the catalyst comprises a mixture of manganese oxide and copper oxide. According to a third aspect of the invention, there is provided use of hopcalite to remove hydrogen and carbon monoxide impurities from a dry gas comprising impurities, wherein said dry gas is substantially free of carbon dioxide.

DETAILED DESCRIPTION

A process for removing hydrogen and carbon monoxide impurities from a dry gas comprising said impurities, wherein said dry gas is at least substantially free of carbon dioxide, said process comprising passing said dry gas through a layer of catalyst comprising a mixture of manganese oxide and copper oxide, with sufficient residence time to produce product gas that is at least substantially free of hydrogen and carbon monoxide. The manganese may be in the form of manganese (IV) oxide and the copper may be in the form of copper (II) oxide.

The catalyst typically comprises from about 30 wt % to about 60 wt manganese and from about 10 wt % to about 30 wt % copper (where "wt %" is based on atomic mass as determined by X-ray fluorescence, or XRF).

The catalyst may consist essentially of oxides of manganese and copper. However, in preferred embodiments, the catalyst comprises at least one (and preferably each) additional metal species selected from the group consisting of potassium, sodium and calcium. The additional metal species are typically present in total amount from about 2 wt % to about 10 wt %.

The catalyst may have any suitable form but is usually granular. The granular catalyst typically has an average particle size from about 2 to about 6 mm.

The catalyst is preferably hopcalite. Different examples of hopcalite catalyst are known in the art. For example, Hopcalite I is a mixture of manganese (II) oxide (~50%), copper (II) oxide (~30%), cobalt (III) oxide (~15%) and silver (I) oxide (~5%). Hopcalite II consists solely of manganese (IV) oxide (~60%) and copper (II) oxide (~40%). Hopcalite I and II may be made by the methods disclosed in Handbook of Preparative Inorganic Chemistry (2nd Ed; edited by G. Brauer; Academic Press; 1963; NY; p 1675).

A particularly preferred catalyst is Carulite® 300 manufactured by Carus Corporation of 315 Fifth Street, Peru, Ill. 61354, USA. This catalyst is a manganese dioxide/copper oxide catalyst having a black/dark brown granular appearance. It has a bulk density of 0.8 to 0.9 g/cm$^3$ and a surface area of at least 200 m$^2$/g. Various particle sizes are available including 4×8 mesh granular (4.75 mm×2.36 mm); 6×12 mesh granular (3.35 mm×1.7 mm); 8×14 mesh granular (2.4 mm×1.4 mm); 10×16 mesh granular (2 mm×1.2 mm); and 12×20 mesh granular (1.7 mm×0.8 mm). All of these particle sizes are in theory suitable for use in the present invention although the 6×12 mesh granular is preferred.

A portion of the hydrogen impurity may be removed using a noble metal catalyst such as palladium or platinum. Such embodiments could potentially provide an opportunity for optimisation of the process using both types of catalyst. However, in preferred embodiments, the hydrogen impurity is removed in the absence of noble metal catalyst. In these embodiments, the manganese oxide/copper oxide catalyst is the sole catalyst present for removing hydrogen.

The dry gas typically has a residence time within the catalyst layer of at least 1.5 s, e.g. at least 2 s. The residence time of the dry gas within the catalyst layer is preferably from about 2 s to about 5 s.

The hydrogen content of the dry gas is typically no more than about 20 ppm, and usually from about 0.2 ppm to about 10 ppm.

The carbon monoxide content of the dry gas is typically no more than about 50 ppm, and usually from about 0.5 ppm to about 20 ppm.

The dry gas typically contains no more than about 10 ppm, usually no more than about 1 ppm, water.

The dry gas typically contains no more than about 10 ppm, usually no more than about 1 ppm, carbon dioxide.

Since the catalyst comprises a mixture of metal oxides, the catalyst itself may provide the oxygen required to oxide carbon monoxide and/or hydrogen. In this regard, carbon monoxide would be oxidised to carbon dioxide according to the following reaction mechanism:

$$CO + MnO_2 \rightarrow CO_2 + MnO$$

On this basis, the presence of oxygen ($O_2$) in the gas is not required for the oxidation. That said, oxygen gas may be present in the dry gas and, if so, would be available as the oxidant for the oxidation reactions. Oxygen may be present in an amount from about 1 mol. % to about 50 mol. %. The dry gas may comprise at least one gaseous component such as nitrogen and the noble gases. In preferred embodiments, the dry gas is air.

The process may be carried out at any suitable pressure, for example at atmospheric pressure or about 1 bar (0.1 MPa). The effect of increasing the pressure of the gas is to increase the partial pressure of the impurity being removed. Since adsorption capacity increases as partial pressure increases, operation of the process at higher pressures enhances the adsorptive capacity of the bed, thereby enabling a reduction in size of the bed. The process is therefore preferably operated at an elevated pressure of more than 1 bar (0.1 MPa) and usually less than 50 bar (5 MPa), e.g. from about 3 bar to about 25 bar (0.3 to 2.5 MPa). Again, throughout the document, pressures given in metric units are calculated on an absolute basis.

The dry gas is typically at a temperature from about 0° C. to about 60° C., e.g. from about 5° C. to about 50° C., such as from about 15° C. to about 30° C., i.e. about ambient temperature.

The product gas typically comprises no more than about 1 ppm, e.g. no more than about 500 ppb, preferably no more than about 50 ppb and more preferably no more than about 10 ppb, carbon monoxide.

The product gas typically comprises no more than about 1 ppm, e.g. no more than about 500 ppb, preferably no more than about 50 ppb and more preferably no more than about 10 ppb, hydrogen.

The dry gas may be formed by passing feed gas through at least one adsorbent layer to remove water and carbon dioxide. The adsorbent layer may comprise either alumina or potassium carbonate-promoted alumina alone (to remove both water and carbon dioxide), or a first layer of alumina or potassium carbonate-promoted alumina (to remove primarily water) together with a second layer of zeolite (e.g. 13X) to remove carbon dioxide.

There may be a layer of carbon dioxide adsorbent material (e.g. 13X zeolite) after the catalyst layer to capture carbon dioxide in the product gas that breaks through the catalyst layer.

In preferred embodiments, the catalyst layer is regenerated. In this connection, the catalyst must be regenerated thermally in order to restore the chemisorptive capacity of the catalyst towards hydrogen. The catalyst layer is preferably regenerated by passing a regeneration gas at a temperature of at least 180° C. through the catalyst layer for at least 25 minutes. More preferably, the regeneration gas is passed at a temperature of at least about 200° C. for at least 1 h. The temperature of the regeneration gas is usually from about 180 to about 250° C. Regeneration gas is usually passed through the catalyst layer for not more than 6 h and usually about 4 h.

Any suitable gas may be used as the regeneration gas. For example, the regeneration gas may comprise a waste gas from a cryogenic distillation process. In another example, the regeneration gas comprises a portion of the product gas. In a yet further example, the regeneration gas comprises oxygen and is at a temperature at least as high as the temperature of the product gas when used as regeneration gas, to supply oxygen to the catalyst surface.

The process is preferably a temperature swing adsorption (TSA) process and the adsorption unit of the second aspect of the invention is usually a TSA unit.

The invention will now be described with reference to the flow sheets depicted in FIGS. 1 and 2.

Figure 1:
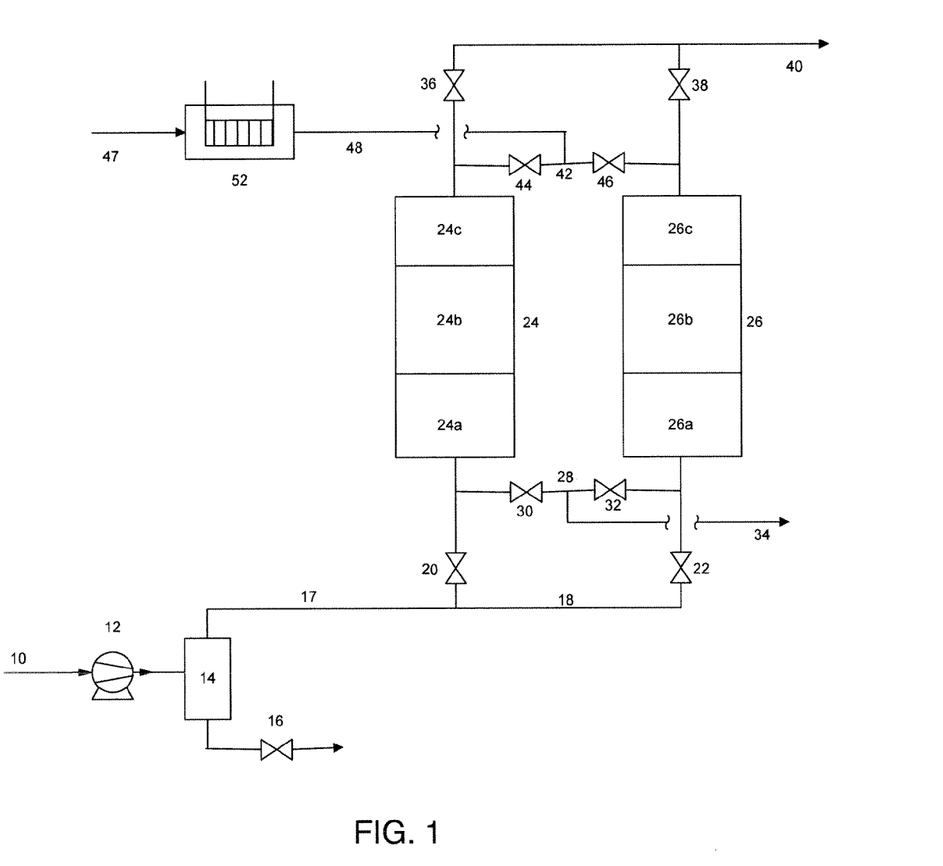
FIG. 1 is a flow sheet depicting an embodiment of the present invention with three layers in each TSA unit.

According to FIG. 1, a stream 10 of air is compressed to an elevated pressure from 3 bar to 25 bar (0.3 to 2.5 MPa) in a main air compressor 12. The compressed stream is cooled in cooler 14 and a portion of the water in the air stream is condensed and separated from the gas and discharged through valve 16. A stream 17 of cooled, partially dried air at a temperature of 5 to 60° C. is then passed to vessel 24 via valve 20. Vessels 24 and 26 are each packed with identical layers of adsorbent and catalyst.

Within the vessels, the feed air passes to a first layer (24a or 26a) of water adsorbent which dries the feed air. This layer can also remove a portion of the carbon dioxide in the feed gas due to co-adsorption of carbon dioxide with water. This layer typically consists of alumina, base-promoted alumina, or silica gel.

The dried feed air then passes to a second layer (24b or 26b) where carbon dioxide is removed to a level of 10 ppm or less. This layer consists of a zeolitic adsorbent such as NaX, NaLSX or CaX.

The dried, carbon dioxide-free air is then passed to a layer of hopcalite (24c or 26c) where carbon monoxide is oxidized to carbon dioxide, hydrogen is chemisorbed and reacted to form water, and the resultant trace levels of carbon dioxide and water produced from these reactions are adsorbed onto the hopcalite.

Air flow continues for a predetermined period of time, and the various layers are sized so that water, carbon dioxide, carbon monoxide, and hydrogen are retained in the bed and a stream of purified air (containing no more than 1 ppm water, no more than 1 ppm carbon dioxide, no more than 500 ppb carbon monoxide, and no more than 500 ppb hydrogen) exits the vessel 24. This purified air passes through valve 36 and is directed as stream 40 to a cryogenic distillation system (not shown) where UHP nitrogen is produced.

Vessel 26 is subjected to thermal regeneration steps while vessel 24 is processing the feed stream. Regeneration desorbs water from layer 26a and carbon dioxide from layer 26b. In addition, thermal regeneration of the hopcalite catalyst in layer 26c restores the hydrogen chemisorption capacity of the material. Thermal regeneration must be conducted at a temperature of at least 180° C., and more preferably 200° C. or more, in order to drive chemisorbed hydrogen/water from the catalyst.

Regeneration is conducted by heating a stream 47 of dry, carbon dioxide-free purge gas through heater 52 to produce a stream 48 of hot purge gas which is fed to vessel 26 via manifold 42 and valve 46. The purge gas can be taken as a portion of the product gas 40 or from waste gas from the cryogenic distillation unit. The hot purge gas passes through layers 26c, 26b, and 26a of vessel 26, thereby regenerating the catalyst and adsorbent. The effluent gas from bed 26 passes through valve 32 and manifold 28 before being vented from the process as stream 34. Once the layers have been sufficiently heated and regenerated, the bed is cooled by turning off or by-passing heater 52 so that cool purge gas at a temperature from 10 to 60° C. flows through the bed.

The feed and regeneration steps are conducted as described for a predetermined period of time, after which the functions of vessels 24 and 26 are switched so vessel 26 comes "on-line" and accepts feed gas, and vessel 24 goes "off-line" and is regenerated. The vessels alternate between feed and regeneration to maintain constant production of purified air.

Those familiar with the art realize that the regeneration step can be conducted in different ways to help improve the efficiency of the process. The bed undergoing regeneration can first be depressurized to essentially atmospheric pressure via valves 30 or 32 and vent 34, and the heating and cooling step can be conducted at the lower pressure. The hot purge fluid can be fed to the vessel until the entire vessel reaches the higher regeneration temperature, and then the cooling gas flow can be started. However, in preferred embodiments, only a portion of the hot purge gas needed to heat the entire contents of the vessel is used before starting the cooling step. This generates a heat pulse that sequentially passes through all the layers of catalyst and adsorbent, and the energy content of the pulse decreases as it passes to the feed side of the vessel (due to heat loss and providing energy for water and carbon dioxide desorption).

FIG. 1 illustrates a two-bed TSA process, but systems utilizing three or more vessels are also possible.

Figure 2:
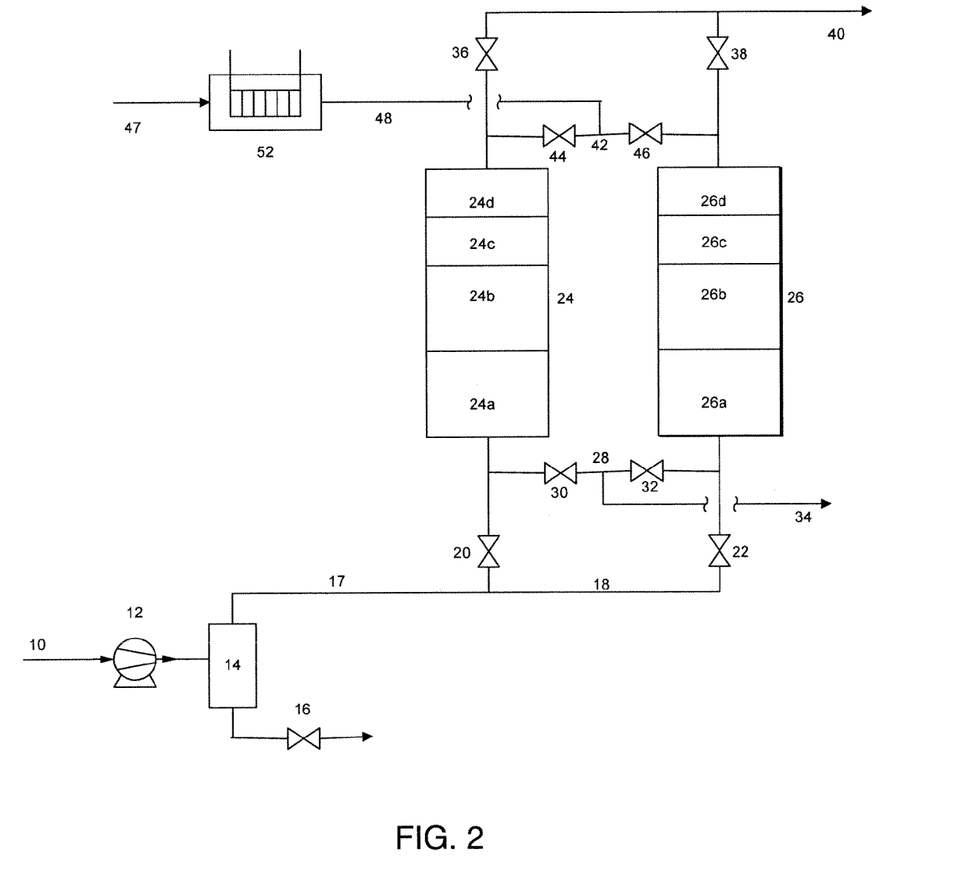
FIG. 2 is a flow sheet depicting an embodiment of the present invention with four layers in each TSA unit.

A second embodiment of the invention is illustrated in FIG. 2 where an additional adsorbent layer 24d, 26d is added after the catalyst layer 24c, 26c. Although the hopcalite catalyst has a significant capacity for carbon dioxide adsorption, the capacity is finite. It is therefore possible that breakthrough of carbon dioxide formed from carbon monoxide oxidation in the catalyst would limit the time during which the system illustrated in FIG. 1 is on-line. In that case, a longer on-line time can be achieved by adding a short layer 24d, 26d of carbon dioxide adsorbent after the hopcalite layer. This layer would consist of a zeolitic adsorbent such as 13X, CaX, or NaLSX.

Aspects and embodiments of the invention include:

1. A process for removing hydrogen and carbon monoxide impurities from a dry gas comprising said impurities, wherein said dry gas is at least substantially free of carbon dioxide, said process comprising passing said dry gas through a layer of catalyst comprising a mixture of manganese oxide and copper oxide, with sufficient residence time to produce product gas that is at least substantially free of hydrogen and carbon monoxide.

2. A process according to #1, wherein the catalyst comprises from about 30 wt % to about 60 wt % manganese and from about 10 wt % to about 30 wt % copper (based on total atomic mass).

3. A process according to #1 or #2, wherein the catalyst is hopcalite.

4. A process according to any of #1 to #3, wherein the residence time within the catalyst layer is at least 1.5 s.

5. A process according to any of #1 to #4, wherein the dry gas comprises up to about 20 ppm hydrogen.

6. A process according to any of #1 to #5, wherein the dry gas comprises up to about 50 ppm carbon monoxide.

7. A process according to any of #1 to #6, wherein the dry gas contains no more than about 10 ppm water.

8. A process according to any of #1 to #7, wherein the dry gas contains no more than about 10 ppm carbon dioxide.

9. A process according to any of #1 to #8, wherein oxygen is present in the dry gas in an amount from about 1 mol. % to about 50 mol. %.

10. A process according to any of #1 to #9, wherein the dry gas is air.

11. A process according to any of #1 to #10, wherein the dry gas is passed through the catalyst layer at a pressure from about 3 bar to about 25 bar (0.3 MPa to 2.5 MPa).

12. A process according to any of #1 to #11, wherein the dry gas is at a temperature from about 0° C. to about 60° C.

13. A process according to any of #1 to #12, wherein the product gas comprises no more than 10 ppb carbon monoxide.

14. A process according to any of #1 to #13, wherein the product gas comprises no more than 10 ppb hydrogen.

15. A process according to any of #1 to #14, wherein the catalyst layer is regenerated by passing a regeneration gas at a temperature of at least 180° C. through the catalyst layer for at least 25 minutes.

16. A process according to #15, wherein the regeneration gas comprises oxygen to supply oxygen to the catalyst surface.

17. A process for removing hydrogen and carbon monoxide impurities from a dry air comprising said impurities, wherein said dry air is at least substantially free of carbon dioxide, said process comprising passing said dry air at a pressure from about 3 bar to about 25 bar (0.3 MPa to 2.5 MPa) and at a temperature from about 0° C. to about 60° C. through a layer of hopcalite catalyst with a residence time within the catalyst layer of at least 1.5 s to produce product gas that is at least substantially free of hydrogen and carbon monoxide.

18. An adsorption unit for removing water, carbon dioxide, hydrogen and carbon monoxide impurities from a gas comprising said impurities, said unit comprising an adsorbent bed, said adsorbent bed consisting of:
  at least one adsorbent layer for removing water and carbon dioxide from said gas to produce dry gas that is substantially free of carbon dioxide;
  a layer of catalyst for removing hydrogen and carbon monoxide impurities from said dry gas to produce product gas that is substantially free of hydrogen and carbon monoxide; and
  optionally, a further adsorbent layer for removing carbon dioxide from the product gas,
wherein the catalyst comprises a mixture of manganese oxide and copper oxide.

19. An adsorption unit according to #18, wherein the catalyst comprises from about 30 wt % to about 60 wt % manganese and from about 10 wt % to about 30 wt % copper (based on total atomic mass).

20. An adsorption unit according to #18 or #19, wherein the catalyst is hopcalite.

21. An adsorption unit according to any of #18 to #20, wherein the length of the catalyst layer is sufficient to provide a residence time for the dry gas in the catalyst layer of at least 1.5 s.

22. An adsorption unit according to any of #18 to #21, wherein the unit is a TSA unit.

23. Use of hopcalite to remove hydrogen and carbon monoxide impurities from a dry gas comprising oxygen and said impurities, wherein said dry gas is substantially free of carbon dioxide.

EXAMPLES

An experimental test system was used to demonstrate the peculiar behaviour of hopcalite under the specific operating conditions of this invention. It consisted of a 42 mm internal diameter by 460 mm length reactor vessel fitted with sample taps along the length of the reactor. It was packed with approximately 550 g of Carulite® 300 obtained from Carus Chemical Company.

Dry air was pre-treated (to remove carbon dioxide and trace levels of hydrogen and carbon monoxide) and used as feed gas, and dilute mixtures in nitrogen (spike gases) of carbon monoxide, hydrogen and/or carbon dioxide were blended with the feed air to achieve the desired feed gas composition.

Column pressure was maintained at 130 psig (1 MPa), and the reactor temperature was controlled with external electrical heating tapes to a temperature from 25 to 40° C.

Before the feed step, the catalyst was regenerated by heating to 200° C. under a counter-current flow of air for at least 4 h, then allowed to cool to room temperature under stagnant (no gas flow) conditions.

A feed step was initiated by starting the desired air and spike gas flows to the column and sampling the gas at the various sample ports with a residual gas analyzer (Peak Laboratories, LLC). This approach yielded hydrogen breakthrough curves that are illustrated in the following examples. Sampling at the multiple sample ports during a run allowed evaluation of the breakthrough performance for various gas residence times, where the residence time is defined as the volume of the catalyst layer from the feed end to the chosen sample port divided by the volumetric feed gas flow rate evaluated at the reactor temperature and pressure. In addition to measuring the carbon monoxide and hydrogen content of the gas, analyzers were also available for measuring the effluent gas carbon dioxide content and dew point.

The chemical composition of the Carulite® 300 sample used in these tests was analyzed by XRF. The multiple catalyst samples consisted of from 46 to 49 wt. manganese and from 24 to 29 wt. % copper. The remaining mass consisted of oxygen and low levels of potassium, sodium, and calcium.

In all of the following examples, units of ppm and ppb are on a molar basis.

Example 1

Removal of Hydrogen by Hopcalite

In this test, the dry, purified air was spiked with dilute hydrogen to yield a feed air stream containing 5 ppm hydrogen. The feed gas flow rate was 3.5 scfm ($1.7 \times 10^{-3}$ m$^3$/s) and the gas residence time in the catalyst layer was 3.6 s.

Figure 3:
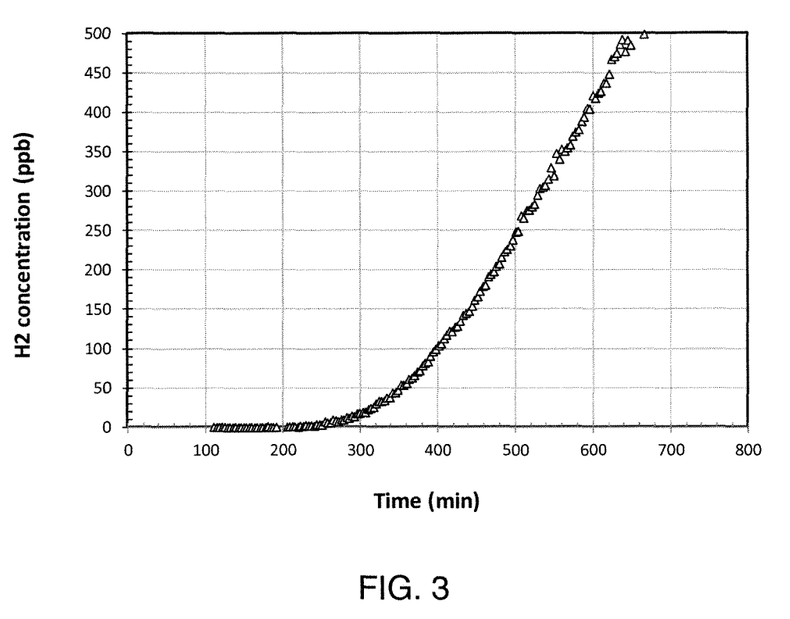
FIG. 3 is a graph depicting the results from Example 1.

FIG. 3 depicts the hydrogen concentration in the gas exiting the catalyst layer. Initially, the gas is free (less than 1 ppb) of hydrogen and it remains that way for about 200 min. This result is completely unexpected, as hopcalite is conventionally regarded as a catalyst for carbon monoxide oxidation rather than for hydrogen oxidation.

The shape of the concentration curve also indicates that the removal of hydrogen is due to chemisorption on the catalyst surface rather than by simple reaction to form water. The hydrogen level slowly climbs once it begins to breakthrough. Thus, a TSA unit packed with sufficient water adsorbent, sufficient carbon dioxide adsorbent, and this catalyst layer would be able to produce an air stream free of water, carbon monoxide and carbon dioxide for about 200 min. One of ordinary skill in the art would be able to calculate the lengths of the layers of the water and carbon dioxide adsorbents that would be sufficient. An increase in on-line time could be achieved by increasing the length of the catalyst layer (thereby increasing the gas residence time).

This test clearly demonstrates that regenerated hopcalite can effectively remove trace levels of hydrogen from an air stream at 25° C. if the feed air is dry and free of carbon dioxide, and the gas residence time is greater than 1.5 s.

Example 2

Effect of Carbon Monoxide on Hydrogen Chemisorption on Hopcalite

In this test, the dry, purified air was spiked with dilute hydrogen and dilute carbon monoxide to yield a feed air stream containing 5 ppm hydrogen and 10 ppm carbon monoxide. The feed gas flow rate was 3.5 scfm ($1.7 \times 10^{-3}$ m$^3$/s) and the gas residence time in the catalyst layer was 3.6 s.

Figure 4:
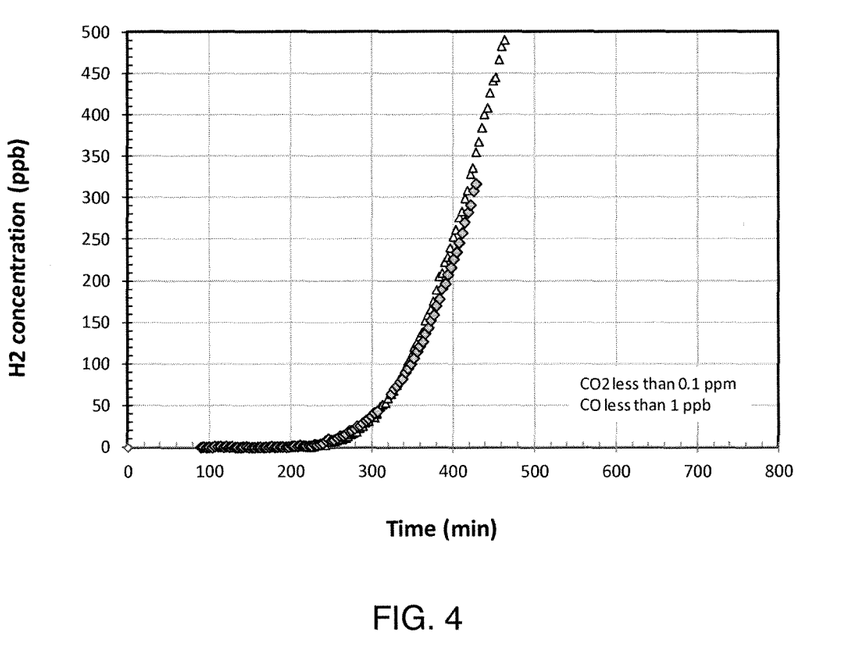
FIG. 4 is a graph depicting the results from Example 2.

FIG. 4 shows the hydrogen concentration in the gas exiting the catalyst layer. Once again, the hydrogen concentration is initially reduced to less than 1 ppb for about 200 min. In addition, the CO concentration is reduced to less than 1 ppb throughout the entire feed step.

The results from two separate feed steps are illustrated in the figure (triangles and diamond symbols), providing evidence that this behaviour is reproducible when the catalyst bed is thermally regenerated at 200° C. for 4 h in a counter-current flow of air at atmospheric pressure.

The concentration of carbon dioxide exiting the catalyst layer was found to be less than 0.1 ppm throughout the entire feed step test. Likewise, the dew point of the exiting gas was found to be lower than −80° C. (less than 1 ppm water). This result indicates that the carbon dioxide and water formed from oxidation of the carbon monoxide and hydrogen respectively is effectively adsorbed or chemisorbed on to the catalyst.

This test clearly demonstrates that hopcalite can effectively remove trace levels of hydrogen and carbon monoxide from an air stream at 25° C. if the feed air is dry and carbon dioxide-free, and the gas residence time is greater than 1.5 s. It also demonstrates that thermal regeneration of the catalyst at 200° C. is effective in restoring the hydrogen and carbon monoxide capacities. In addition, it demonstrates that the catalyst can also effectively remove the products of the oxidation reactions. A TSA unit packed with sufficient water adsorbent, sufficient carbon dioxide adsorbent, and this catalyst layer would be able to produce a dry air stream free of carbon monoxide, carbon dioxide and hydrogen for about 200 min from feed air containing 5 ppm hydrogen and 10 ppm carbon monoxide.

Example 3

Effect of Carbon Dioxide on Hydrogen Chemisorption on Hopcalite

In this test, the dry, purified air was spiked with dilute hydrogen and dilute carbon dioxide to yield a feed air stream containing 5 ppm hydrogen and 400 ppm carbon dioxide (which is the level of carbon dioxide that would be in the air if only water removal was conducted before the catalyst layer). The feed gas flow rate was 3.5 scfm ($1.7 \times 10^3$ m$^3$/s) and the gas residence time in the catalyst layer was 3.6 seconds.

Figure 5:
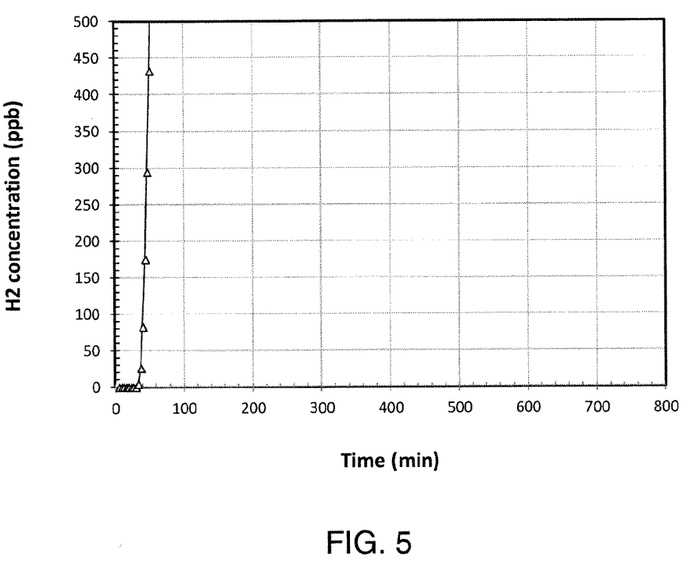
FIG. 5 is a graph depicting the results from Example 3.

FIG. 5 depicts the hydrogen concentration in the gas exiting the catalyst layer. Compared to Examples 1 and 2, hydrogen breakthrough is earlier (i.e. after only 30 min) and the hydrogen level increases very quickly. The presence of 400 ppm carbon dioxide clearly and dramatically reduces the potential for hopcalite to remove hydrogen from the air stream. The Inventors believe that the masking effect of carbon dioxide is one reason why the present behaviour of hopcalite has remained unnoticed in the art until now.

Example 4

Hydrogen Breakthrough as a Function of Residence Time

In this test, the dry, purified air was spiked with dilute hydrogen and dilute carbon monoxide to yield a feed air stream containing 5 ppm hydrogen and 10 ppm carbon monoxide. The feed gas flow rate was 3.5 scfm ($1.7 \times 10^{-3}$ m$^3$/s), but gas was sampled at three different locations along the bed consistent with residence times of 12 s, 2.5 s, and 3.7 s.

Figure 6:
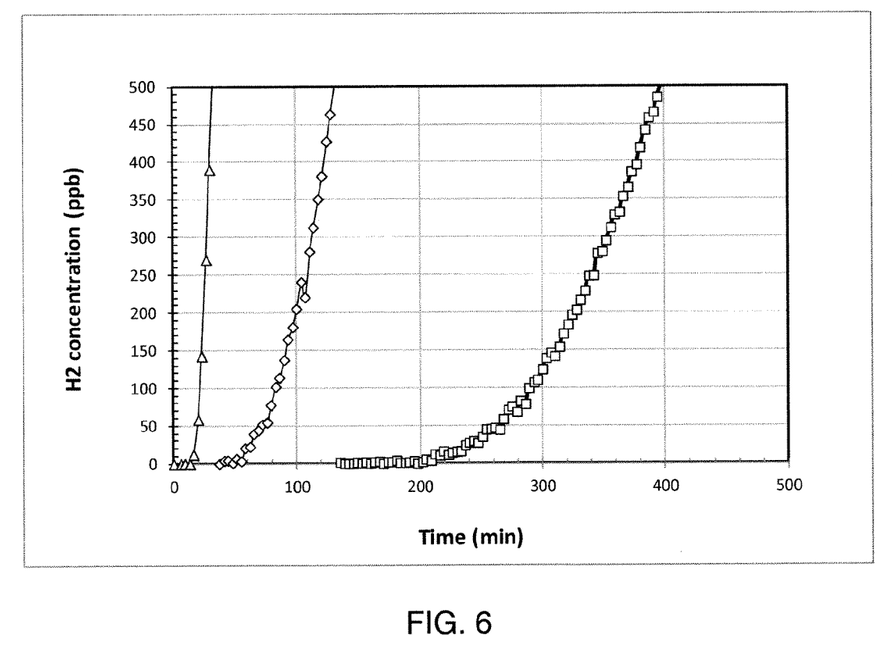
FIG. 6 is a graph depicting the results from Example 4.

FIG. 6 shows the hydrogen concentration in the gas exiting the catalyst layer. Breakthrough of 10 ppb hydrogen occurs within 15 min when the residence time is only 1.2 s (triangles). Surprisingly, the breakthrough time extends to 57 min when the residence time doubles to 2.5 s (diamonds), and reaches 210 min when it is tripled to 3.7 s (squares).

The results clearly indicate that a higher residence time strongly favors increased effective hydrogen chemisorption capacity. A minimum residence time of about 1.5 s is therefore typically needed to achieve reasonable capacities. In contrast, prior art process typically involve a residence time within a hopcalite layer of less than 1.2 s which would appear to provide a further reason why the use of hopcalite for hydrogen removal has not been considered previously.

Example 5

Hydrogen Breakthrough with Carbon Dioxide Breakthrough as Well

In this test, the dry, purified air was spiked with dilute hydrogen and dilute carbon monoxide to yield a feed air stream containing 5 ppm hydrogen and 10 ppm carbon monoxide. The feed gas flow rate was 3.6 scfm ($1.7 \times 10^{-3}$ m$^3$/s) and the residence time in the catalyst layer was 3.2 s. The feed gas and column temperature in this case were changed to 55° C.

Figure 7:
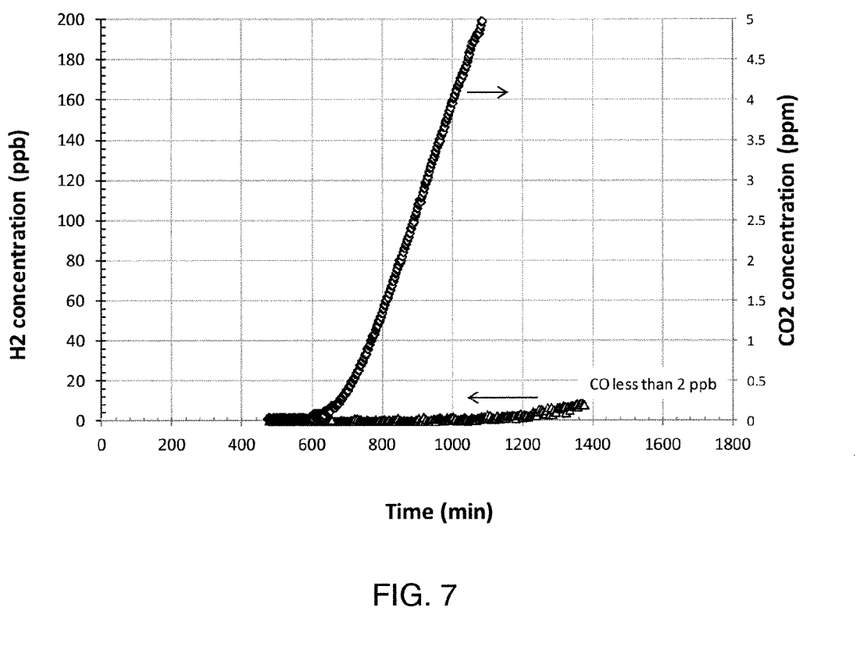
FIG. 7 is a graph depicting the results from Example 5.

FIG. 7 depicts the hydrogen concentration in the gas exiting the catalyst layer. Breakthrough of 10 ppb hydrogen occurs at around 1400 min (triangles). Carbon dioxide also breaks through the catalyst layer (diamonds). This result is in contrast to the test run of Example 2 at the same conditions except lower temperature where the carbon dioxide level was always less than 0.1 ppm. In the current case, breakthrough of carbon dioxide from the catalyst layer would control the on-line time of the TSA unit rather than hydrogen breakthrough. For 1 ppm carbon dioxide, the on-line time would be 760 min. Addition of a properly sized zeolitic adsorbent layer (e.g., 13X) after the catalyst would remove this carbon dioxide and restore the longer on-line time.

It will be appreciated that the invention is not restricted to the details described above with reference to the preferred embodiments but that numerous modifications and variations can be made without departing from the spirit and scope of the invention as defined in the following claims.

The invention claimed is:

1. A process for removing hydrogen and carbon monoxide impurities from a dry gas comprising said impurities, wherein said dry gas is at least substantially free of carbon dioxide, said process comprising passing said dry gas through a layer of catalyst comprising a mixture of manganese oxide and copper oxide, with sufficient residence time to produce product gas exiting the layer of catalyst comprising the mixture of manganese oxide and copper oxide that is at least substantially free of hydrogen and carbon monoxide, wherein the residence time within the catalyst layer is at least 1.5 s.

2. The process according to claim 1, wherein the layer of catalyst comprises from 30 to 60 wt % manganese and from 10 to 30 wt % copper (based on total atomic mass).

3. The process according to claim 1, wherein the layer of catalyst is hopcalite.

4. The process according to claim 1, wherein the dry gas comprises up to about 20 ppm hydrogen.

5. The process according to claim 1, wherein the dry gas comprises up to about 50 ppm carbon monoxide.

6. The process according to claim 1, wherein the dry gas contains no more than about 10 ppm water.

7. The process according to claim 1, wherein the dry gas contains no more than about 10 ppm carbon dioxide.

8. The process according to claim 1, wherein oxygen is present in the dry gas in an amount from about 1 mol. % to about 50 mol. %.

9. The process according to claim 1, wherein the dry gas is air.

10. The process according to claim 1, wherein the dry gas is passed through the layer of catalyst at a pressure from about 3 bar to about 25 bar (0.3 MPa to 2.5 MPa).

11. The process according to claim 1, wherein the dry gas is at a temperature from about 0° C. to about 60° C.

12. The process according to claim 1, wherein the product gas comprises no more than 10 ppb carbon monoxide.

13. The process according to claim 1, wherein the product gas comprises no more than 10 ppb hydrogen.

14. The process according to claim 1, wherein the layer of catalyst is regenerated by passing a regeneration gas at a temperature of at least 180° C. through the layer of catalyst for at least 25 minutes.

15. The process according to claim 14, wherein the regeneration gas comprises oxygen to supply oxygen to the layer of catalyst surface.

16. A process for removing hydrogen and carbon monoxide impurities from a dry air comprising said impurities, wherein said dry air is at least substantially free of carbon dioxide, said process comprising passing said dry air at a pressure from about 3 bar to about 25 bar (0.3 MPa to 2.5 MPa) and at a temperature from about 0° C. to about 60° C. through a layer of hopcalite catalyst with a residence time within the catalyst layer of at least 1.5 s to produce product gas exiting the layer of hopcalite catalyst that is at least substantially free of hydrogen and carbon monoxide.

17. An adsorption unit for removing water, carbon dioxide, hydrogen and carbon monoxide impurities from a gas comprising said impurities, said unit comprising an adsorbent bed, said adsorbent bed consisting of:
- at least one adsorbent layer for removing water and carbon dioxide from said gas to produce dry gas that is substantially free of carbon dioxide;
- a layer of catalyst for removing hydrogen and carbon monoxide impurities from said dry gas to produce product gas that is substantially free of hydrogen and carbon monoxide; and
- optionally, a further adsorbent layer for removing carbon dioxide from the product gas, wherein the layer of catalyst comprises a mixture of manganese oxide and copper oxide and the length of the catalyst layer is sufficient to provide a residence time for the dry gas in the catalyst layer of at least 1.5 s.

18. The adsorption unit according to claim 17, wherein the layer of catalyst comprises from 30 to 60 wt % manganese and from 10 to 30 wt % copper (based on total atomic mass).

19. The adsorption unit according to claim 17, wherein the layer of catalyst is hopcalite.

20. The adsorption unit according to claim 17, wherein the unit is a thermal swing adsorption unit.

* * * * *